US012798596B2

(12) United States Patent
Cho et al.

(10) Patent No.: US 12,798,596 B2
(45) Date of Patent: Nov. 17, 2026

(54) METHOD OF CONTROLLING SYSTEM LIMIT OF A VEHICLE PERFORMING CIRCUIT MODE

(71) Applicants: HYUNDAI MOTOR COMPANY, Seoul (KR); KIA CORPORATION, Seoul (KR)

(72) Inventors: Jin Kyeom Cho, Suwon-si (KR); Ho Kyun Chun, Seoul (KR); Dong Hyeon Woo, Daegu (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 187 days.

(21) Appl. No.: 18/231,920

(22) Filed: Aug. 9, 2023

(65) Prior Publication Data

US 2024/0351596 A1 Oct. 24, 2024

(30) Foreign Application Priority Data

Apr. 20, 2023 (KR) ........................ 10-2023-0051867

(51) Int. Cl.
*B60W 50/08* (2020.01)
*B60W 30/18* (2012.01)
*B60W 30/182* (2020.01)

(52) U.S. Cl.
CPC .... *B60W 50/082* (2013.01); *B60W 30/18127* (2013.01); *B60W 30/182* (2013.01);
(Continued)

(58) Field of Classification Search
CPC ......... B60W 50/082; B60W 30/18127; B60W 30/182; B60W 2420/403;
(Continued)

(56) References Cited

U.S. PATENT DOCUMENTS 11,027,764 B2 * 6/2021 Chow .................... B60K 35/10
12,005,374 B1 * 6/2024 Jones .................... B62D 63/02
(Continued)

FOREIGN PATENT DOCUMENTS

KR 20160037816 A 4/2016

OTHER PUBLICATIONS

Jung et al., An Autonomous System for Head-to-Head Race: Design, Implementation and Analysis; Team KAIST at the Indy Autonomous Challenge, Mar. 16, 2023, arXiv:2303.09463v1, pp. 1-35 (Year: 2023).*

(Continued)

*Primary Examiner* — Sze-Hon Kong
(74) *Attorney, Agent, or Firm* — Lempia Summerfield Katz LLC

(57) ABSTRACT

A method of controlling system limit of a vehicle performing a circuit mode includes determining, by a controller, whether the vehicle arrives at a circuit and enters the circuit mode. The method also includes determining, by the controller, whether safe travel is required based on racing situation information in the circuit upon determining that the vehicle enters the circuit mode. The method additionally includes performing, by the controller, system limit release control for releasing a limit state of a vehicle system for vehicle driving upon determining that safe travel is unnecessary. The disclosed method may limit a vehicle system interlocked with a circuit mode in a vehicle capable of performing a circuit mode in which a general driver may travel on and experience a circuit using a vehicle of the driver.

14 Claims, 12 Drawing Sheets

(52) U.S. Cl.
CPC . *B60W 2420/403* (2013.01); *B60W 2510/244* (2013.01); *B60W 2510/246* (2013.01)

(58) Field of Classification Search
CPC ..... B60W 2510/244; B60W 2510/246; B60W 2710/083; B60W 10/06; B60W 10/08; B60W 10/184; B60W 20/00; B60W 20/10; B60W 20/15; B60W 2540/10; B60W 2555/60; B60W 2556/50; B60W 2710/248; B60W 40/02; B60W 50/085; B60W 2510/087; B60W 2552/05; B60W 2720/10; B60Y 2300/89; B60Y 2200/91; B60L 50/60; Y02T 10/70; Y02T 10/7072; Y02T 10/72
See application file for complete search history.

(56) References Cited

U.S. PATENT DOCUMENTS

| | | | | |
|---|---|---|---|---|
| 12,115,880 | B2 * | 10/2024 | Diamond | G01C 21/3889 |
| 12,275,393 | B2 * | 4/2025 | Filipenko | B60W 60/0025 |
| 2009/0028440 | A1 * | 1/2009 | Elangovan | H04N 5/272 382/103 |
| 2010/0304640 | A1 * | 12/2010 | Sofman | A63H 18/12 446/456 |
| 2011/0054757 | A1 * | 3/2011 | Casella | B60T 8/1755 701/72 |
| 2015/0006041 | A1 * | 1/2015 | Froling | G05B 19/02 701/49 |
| 2017/0080948 | A1 * | 3/2017 | Lubbers | B60W 50/14 |
| 2017/0080951 | A1 * | 3/2017 | Grossman | G06F 3/0488 |
| 2017/0270803 | A1 * | 9/2017 | High | G08G 5/55 |
| 2017/0302970 | A1 * | 10/2017 | Dudko | H04W 4/029 |
| 2018/0257631 | A1 * | 9/2018 | Fodor | B60W 10/18 |
| 2018/0301169 | A1 * | 10/2018 | Ricciardi | G11B 27/036 |
| 2019/0073900 | A1 * | 3/2019 | Colbert | F21V 33/008 |
| 2019/0111925 | A1 * | 4/2019 | Sata | B60W 10/30 |
| 2019/0130741 | A1 * | 5/2019 | Eastling | H04W 4/022 |
| 2019/0180532 | A1 * | 6/2019 | Melson | G06V 20/584 |
| 2019/0299993 | A1 * | 10/2019 | Inada | B60Q 1/46 |
| 2019/0365289 | A1 * | 12/2019 | Kataoka | A61B 5/1122 |
| 2020/0001910 | A1 * | 1/2020 | Chow | B60K 35/50 |
| 2020/0126448 | A1 * | 4/2020 | Spano | G06F 3/165 |
| 2020/0148254 | A1 * | 5/2020 | Magrath, III | A63G 33/00 |
| 2020/0184849 | A1 * | 6/2020 | Spence | B60W 30/18145 |
| 2021/0192975 | A1 * | 6/2021 | Spence | G01C 21/365 |
| 2023/0158409 | A1 * | 5/2023 | Gardner | A63F 13/803 463/6 |
| 2024/0059325 | A1 * | 2/2024 | Rubin | B60W 60/0027 |
| 2024/0101120 | A1 * | 3/2024 | Welch | B60W 30/182 |
| 2024/0116492 | A1 * | 4/2024 | Filipenko | B60W 30/02 |
| 2024/0139645 | A1 * | 5/2024 | Shimchik | A63K 3/00 |
| 2024/0278683 | A1 * | 8/2024 | Welch | B60L 15/2045 |
| 2025/0131729 | A1 * | 4/2025 | Schiffer | G06V 10/255 |
| 2025/0381846 | A1 * | 12/2025 | Takagi | B60K 35/28 |

OTHER PUBLICATIONS

Staff Report, What the flags mean in NASCAR, https://nascar101.nascar.com/2021/06/28/what-the-flags-mean-in-nascar/ (Year: 2021).*

Jungel et al., A Real-Time Auto-Adjusting Vision System for Robotic Soccer, https://web.archive.org/web/20110429005857/http:/martin-loetzsch.de/publications/rc03-vision.pdf, pp. 1-12 (Year: 2011).*

Zheng et al., Autonomous Vehicles on the Edge: A Survey on Autonomous Vehicle Racing, Jun. 8, 2022, Intelligent Transportation Systems, vol. 3, 2022, pp. 458-488 (Year: 2022).*

Track Mode, Mar. 25, 2023, http://web.archive.org/web/20230325125513/https://www.tesla.com/ownersmanual/model3/en_us/GUID-92CA3DCA-EDA3-4243-861E-2C770F5506FD.html, pp. 1-5 (Year: 2023).*

* cited by examiner (BEFORE CHANGE)

(AFTER CHANGE)

METHOD OF CONTROLLING SYSTEM LIMIT OF A VEHICLE PERFORMING CIRCUIT MODE

CROSS-REFERENCE TO RELATED APPLICATION

This application claims the benefit of and priority to Korean Patent Application No. 10-2023-0051867, filed on Apr. 20, 2023, the entire contents of which are incorporated herein by reference.

TECHNICAL FIELD

The present disclosure relates to a method of controlling system limit of a vehicle, and more particularly, to a control method for limiting a vehicle system interlocked with a circuit mode in a vehicle capable of performing a circuit mode in which a general driver may travel on and experience a circuit using a vehicle of the driver.

BACKGROUND

Traditionally, speed competition with others using vehicles has been performed through vehicle racing. In general, vehicle racing is performed through competitions on a racetrack, and ordinary people have indirectly satisfied desire for speed competition and racing by watching vehicle racing on the racetrack.

There has been little opportunity for ordinary drivers to race vehicles on racetracks. Only professional racers who chose racing as a profession have mostly been able to participate in vehicle racing. General drivers may conduct vehicle racing on public roads. However, vehicle racing on public roads is legally prohibited since there are laws against speeding, for example, and the risk of accidents is significantly high.

However, it is a reality that the desire for speed competition and racing is further increasing for drivers as the base of motor sports has recently expanded and vehicle performance has gradually improved.

Accordingly, vehicle manufacturers hold various events, such as complex cultural content events on a circuit, i.e., a racing road, to provide opportunities for the general public to experience racing (vehicle racing) on the circuit.

Moreover, recently, a number of circuits where general drivers may experience racing have been built and constructed all over the country, and these circuits across the country may be used by general drivers through simple procedures.

A driver using a circuit may check a lap time of the driver on the circuit, and compare the lap time with a lap time of a party or a lap time of another driver using the circuit. In this way, it is possible to enjoy the pleasure of high-speed driving, and to enjoy the fun of comparing driving skills with others.

As interest in circuit travel and experience and the desire for speed competition have been growing, more drivers desire to improve understanding of vehicles and circuits and enjoy fun driving in environments different from daily driving conditions using vehicles of the drivers.

In addition, it is desired to develop technology capable of increasing understanding of vehicles and circuits to provide fun driving in an environment different from everyday driving conditions, and maximizing acceleration, braking, and turning performance of a vehicle and providing more reliable fun driving to a driver through differentiation of control and strategy for limiting a vehicle system when performing a circuit mode that allows circuit travel and experience.

The matters described in this background section are intended to enhance understanding of the background of the disclosure and may include matters that are not already to those having ordinary skill in the art.

SUMMARY OF THE DISCLOSURE

The present disclosure has been made in an effort to solve the above-described problems associated with prior art.

The present disclosure has been created in consideration of the above description. An object of the present disclosure is to provide a control method for circuit mode driving of a vehicle capable of satisfying desire of a driver for speed competition and fun driving and improving marketability of the vehicle by allowing a general driver more conveniently travel on and experience a circuit using a vehicle of the driver.

In addition, another object of the present disclosure is to provide a control method capable of limiting a vehicle system in a more differentiated manner in conjunction with a circuit mode in a vehicle capable of performing a circuit mode in which a general driver may travel on and experience a circuit using a vehicle of the driver.

The objects of the present disclosure are not limited to the objects mentioned above, and other objects not mentioned herein may be clearly understood by those of ordinary skill in the art to which the present disclosure puritans (sometimes referred to herein as "those having ordinary skill in the art") from the description below.

In one aspect, the present disclosure provides a method of controlling system limit of a vehicle performing a circuit mode. The method includes determining, by a controller, whether the vehicle arrives at a circuit and enters the circuit mode. The method also includes determining, by the controller, whether safe travel is required based on racing situation information on the circuit upon determining that the vehicle enters the circuit mode. The method further includes performing, by the controller, system limit release control for releasing a limit state of a vehicle system for vehicle driving upon determining that safe travel is unnecessary.

Other aspects and embodiments of the present disclosure are discussed below.

The above and other features of the disclosure are discussed below in detail.

BRIEF DESCRIPTION OF THE DRAWINGS

The above and other features of the present disclosure are described in detail with reference to the accompanying drawings which are provided for illustration only, and thus are not limitative of the present disclosure, wherein.

Figure 1:
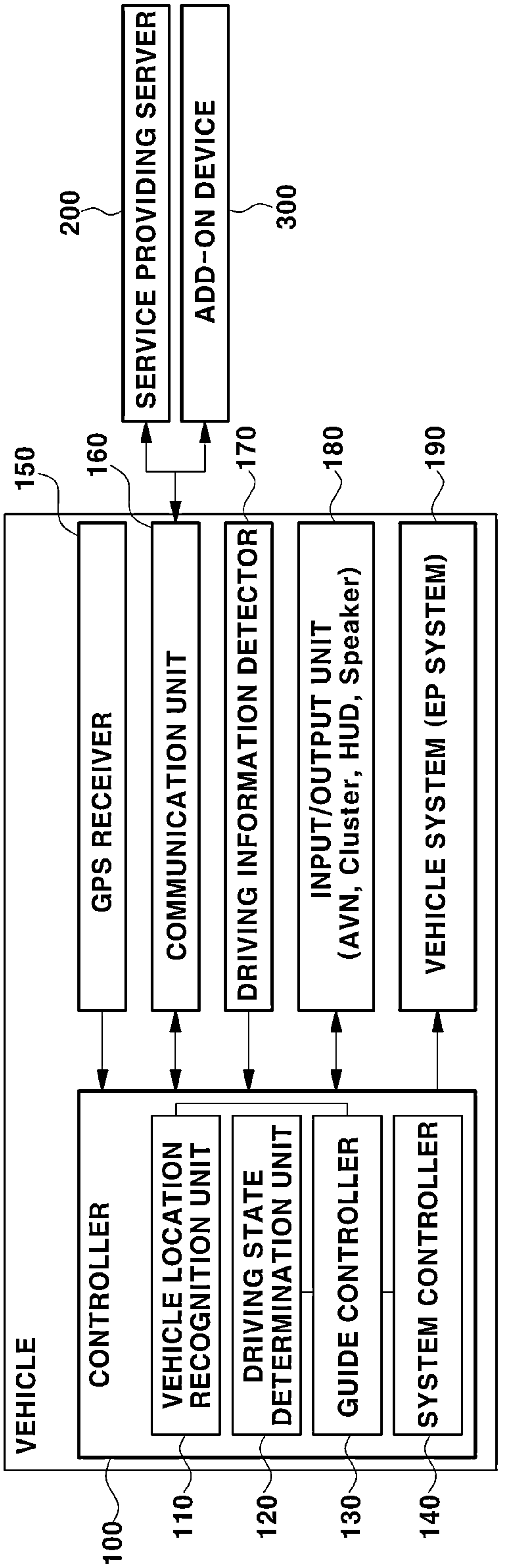
FIG. 1 is a block diagram illustrating a configuration of a system for performing a circuit mode of a vehicle, according to an embodiment of the present disclosure.

It should be understood that the accompanying drawings are not necessarily to scale, presenting a somewhat simplified representation of various features illustrative of the basic principles of the disclosure. The specific design features of the present disclosure, including, for example, specific dimensions, orientations, locations, and shapes can be determined in part by the particular intended application and use environment.

In the figures, reference numbers refer to the same or equivalent parts of the present disclosure throughout the several figures of the drawing.

DETAILED DESCRIPTION

Hereinafter, embodiment of the present disclosure are described in detail with reference to the accompanying drawings. Specific structural or functional descriptions presented in the embodiments of the present disclosure are only illustrative for the purpose of describing embodiments according to the concept of the present disclosure. Embodiments according to the concept of the present disclosure may be implemented in various forms. In addition, the present disclosure should not be construed as being limited to the embodiments described herein, and should be understood to include all modifications, equivalents, and substitutes included in the spirit and scope of the present disclosure.

In the following description, even though terms such as "first," "second," etc. may be used to describe various elements, the elements are not limited by these terms. These terms are only used to distinguish one element from another. For example, within the scope not departing from the scope of rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, e.g., expressions such as "between" and "immediately between" or "adjacent to" and "directly adjacent to," should be interpreted similarly.

Like reference numerals refer to like elements throughout. The terminology used herein is for the purpose of describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

When a component, device, element, or the like of the present disclosure is described as having a purpose or performing an operation, function, or the like, the component, device, or element should be considered herein as being "configured to" meet that purpose or perform that operation or function.

The term "unit" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

FIG. 1 is a block diagram illustrating a configuration of a system for performing a circuit mode of a vehicle, according to an embodiment of the present disclosure. As shown, the system for performing the circuit mode of the vehicle includes a vehicle-mounted device mounted on the vehicle and a vehicle external device provided to be able to communicate with the vehicle from outside the vehicle.

The vehicle-mounted device may include a controller 100, a GPS receiver 150, a communication unit 160, a driving information detector 170, an input/output unit 180, and a vehicle system 190. The vehicle external device may include a service providing server 200 and an add-on device 300.

The controller 100 performs control for performing a circuit mode and vehicle control. The controller 100 includes a vehicle location recognition unit 110 configured to determine a current location of the vehicle in real time based on a signal (for example, a GPS signal) related to a location of the vehicle received from the outside. The controller 100 also includes a travel state determination unit 120 configured to determine a vehicle driving state and a travel state based on information collected from the vehicle. The controller 100 further includes a guide controller 130 configured to collect various information related to the circuit mode and perform control for guiding the driver. The controller 100 additionally includes a system controller 140 configured to control the vehicle system 190 when the vehicle enters the circuit.

Components included in the controller 100, i.e., the vehicle location recognition unit 110, the travel state determination unit 120, the guide controller 130, and the system controller 140, may perform cooperative control for the circuit mode of the vehicle while exchanging information with each other.

The GPS receiver 150 is provided to receive a GPS signal representing the current location of the vehicle from outside the vehicle. In addition, the GPS receiver 150 is provided to be able to input a GPS signal received as a signal related to a vehicle location to the vehicle location recognition unit 110 of the controller 100.

In the vehicle, the communication unit 160 may receive a signal related to the vehicle location through communication with the vehicle external device. The signal received by the communication unit 160 may be input to the vehicle location recognition unit 110 of the controller 100.

The vehicle external device may be one of add-on devices 300 connected to communicate with the communication unit 160 of the vehicle, such as a smartphone having a built-in GPS sensor or a smart device such as a tablet computer or a wearable device. The communication unit 160 may comprise a communication interface provided to perform communication with the smart device in the vehicle.

The vehicle location recognition unit 110 of the controller 100 may determine the current location of the vehicle from the GPS signal received and input through the GPS receiver 150 or the signal related to the vehicle location received and input through the communication unit 160.

The driving information detector 170 is a component configured to detect information indicating the real-time driving state and travel state of the vehicle, i.e., vehicle driving information. The real-time vehicle driving information detected by the driving information detector 170 may include vehicle state information and driver driving input information.

The driving information detector 170 may include an accelerator pedal detector configured to detect accelerator pedal input information according to an operation of an accelerator pedal by the driver. The driving information detector 170 may also include a brake pedal detector configured to detect brake pedal input information according to an operation of a brake pedal by the driver.

In an embodiment, the driving information detector 170 may include a steering angle detector configured to detect a steering angle according to an operation of a steering wheel by the driver. In an embodiment, the driving information detector 170 may include an acceleration detector configured to detect acceleration of the vehicle.

The accelerator pedal detector may be a conventional accelerator pedal sensor (APS) installed on the accelerator pedal to output an electrical signal according to an accelerator pedal operation state of the driver.

The brake pedal detector may be a conventional brake pedal sensor (BPS) installed on the brake pedal to output an electrical signal according to a brake pedal operation state of the driver.

The acceleration detector may be a normal G-sensor, and the steering angle detector may be a normal steering angle sensor (SAS) configured to output an electrical signal according to a steering wheel operation by the driver.

The driving information detector 170 may further include a wheel speed detector configured to detect a wheel speed, and the wheel speed detector may be a conventional wheel speed sensor. In addition, the controller 100 may obtain wheel speed and vehicle speed information from a signal of the wheel speed sensor. Since the fact that the vehicle speed information may be obtained from a signal of the wheel speed sensor is a well-known technical matter in the art, a detailed description thereof has been omitted.

In an embodiment, instead of using a signal of the wheel speed detector (wheel speed sensor) to obtain the vehicle speed information, the driving information detector 170 may further include a separate vehicle speed detector configured to detect the vehicle speed. Alternatively, the controller 100 may acquire vehicle speed information in real time based on vehicle location information obtained from a GPS signal.

Accordingly, the vehicle driving information may include an APS value detected by the accelerator pedal detector as a driving input value according to an accelerator pedal operation by the driver and a BPS value detected by the brake pedal detector as a driving input value according to a brake pedal operation by the driver.

In an embodiment, the vehicle driving information may include vehicle acceleration detected by the acceleration detector and a steering angle detected by the steering angle detector. The vehicle driving information may include a wheel speed detected by the wheel speed detector. In an embodiment, the vehicle driving information may include a vehicle speed obtained from a signal of the wheel speed detector or a GPS signal or detected by the vehicle speed detector.

In the real-time vehicle driving information representing a current driving state and travel state of the vehicle as described above, the accelerator pedal input value and the brake pedal input value, i.e., pedal input (acceleration input and braking input) information, and the steering angle, i.e., steering input information, correspond to driver driving input information, and vehicle acceleration, wheel speed, vehicle speed, etc. correspond to vehicle state information.

In addition, the driving information detector 170 may optionally further include parts such as a driving motor and a battery, a sensor configured to detect temperature of engine oil and coolant, a sensor configured to detect a rotational speed of a driving device (engine and driving motor), a sensor configured to detect brake fluid pressure or tire pressure, etc. In the real-time vehicle driving information, vehicle state information may further include information detected by these sensors.

The real-time vehicle driving information obtained from the vehicle through the driving information detector 170 is input to the travel state determination unit 120 of the controller 100 The travel state determination unit 120 may determine and recognize a vehicle driving state and a travel state from a signal of the driving information detector 170. When the vehicle driving state and the travel state are determined, the travel state determiner 120 may transmit the vehicle driving state and the travel state to the guide controller 130.

The communication unit 160 is provided to perform wired or wireless communication with the vehicle external device. Information received from the vehicle external device through the communication unit 160 may be transferred to the vehicle location recognition unit 110, the travel state determination unit 120, the guide controller 130, and the system controller 140 of the controller 100.

The communication unit 160 may include a communication device of an AVN (Audio, Video & Navigation) system mounted in the vehicle and capable of performing wireless communication with the vehicle external device through a mobile communication network. In various embodiments, the communication unit 160 may be adopted without limitation as long as the communication unit 160 is provided in the vehicle and may perform wireless communication between the controller 100 and the vehicle external device.

The vehicle external device may comprise the service providing server 200 and the add-on device 300 communicating with the communication unit 160 of the vehicle. The add-on device 300 may be a smartphone or a smart device such as a tablet computer or a wearable device.

In an embodiment, when the add-on device 300 is wired or wirelessly connected, the communication unit 160 may further include a communication interface such as a connector or a transceiver enabling communication between the controller 100 and the add-on device 300.

For example, the communication unit 160 may further include a vehicle connector enabling communication between the controller 100 and the add-on device 300 while the add-on device 300 is connected. The connector may be a diagnostic connector, such as a general On-Board Diagnostics (OBD) connector.

The input/output unit 180 is connected to the controller 100 and includes an input device operated by the driver to input or select necessary information related to the circuit mode or circuit travel and an output device configured to output the information.

The input device of the input/output unit 180 may be a button or a switch provided in the vehicle. Additionally or alternatively, the input device of the input/output unit 180 may be a touchscreen, etc. Accordingly, when the driver operates the input device of the input/output unit 180, input information or selection information according to the operation may be input to the controller 100.

The output device of the input/output unit 180 may include a display device provided to display various information in the vehicle, and may additionally further include a sound output device provided to output auditory information as sound through a vehicle speaker.

The input device and the output device of the input/output unit 180 may be an input device and a display device of the AVN system. Among output devices of the input/output unit 180, a cluster or a head-up display (HUD) may be used as a display device.

The HUD may be an augmented reality (AR) HUD configured to display information as an augmented reality image on a windshield of the vehicle.

In an embodiment, the add-on device 300 such as a communicatively connected smartphone may be used as the input/output unit 180. The driver may input or receive desired information by using the smartphone having an application installed thereon, in the same way as when using the input/output unit 180 of the vehicle.

The input/output unit 180 may be connected to the guide controller 130 among the components of the controller 100. The guide controller 130 may be connected to receive information through the input device of the input/output unit 180. Information input to the guide controller 130 through the input/output unit 180 may be delivered to the travel state determination unit 120 or the system controller 140. In addition, the guide controller 130 may control an operation of the output device of the input/output unit 180 to output predetermined information such as information related to the circuit mode and guide the driver.

In an embodiment, the driver may move to a user setting mode (USM) through the input device and the output device (display device, for example, the cluster) of the input/output unit 180, and input and set sets values related to the circuit mode to the controller 100.

For example, the driver may perform settings for selecting or inputting on or off of the circuit mode in the USM. When the circuit mode is set to be on, control for the circuit mode may be performed by the controller 100 in response to the vehicle entering the circuit. On the other hand, when the circuit mode is set to be off, control of the circuit mode may be not performed.

The guide controller 130 may determine whether the vehicle has arrived at the circuit by communicating with the AVN system based on the current location information of the vehicle input from the vehicle location recognition unit 110. When the vehicle has arrived at the circuit, the guide controller 130 may inform the driver that the vehicle has arrived at the circuit by outputting this information through the output device (display device or sound output device) of the input/output unit 180.

The AVN system may receive various information about the circuit from the service providing server 200 or the add-on device 300 through the communication device thereof, e.g., one of communication units 160 of the vehicle, and may provide the information to the guide controller 130 of the controller 100. For example, circuit-related information such as a circuit location may be selectively received from the service providing server 200 or the add-on device 300, and then provided to the guide controller 130 of the controller 100.

Accordingly, the guide controller 130 may determine whether the vehicle has arrived within the current circuit based on the current location information of the vehicle input from the vehicle location recognition unit 110 and the circuit-related information (circuit location information) input from the AVN system.

The guide controller 130 may then receive input of information received from the service providing server 200 or the add-on device 300 through the communication unit 160, for example, the communication device of the AVN system, and may provide the input information to another component in the controller 100.

For example, the guide controller 130 may receive input of circuit-related information or driver information from the service providing server 200 or the add-on device 300 through the communication device of the AVN system, and may provide the received information to the travel state determination unit 120 or the system controller 140. Further, when the vehicle arrives at the circuit and enters the circuit mode, the guide controller 130 may provide a signal notifying that the circuit mode has been entered to the system controller 140.

The system controller 140 may perform control required for circuit mode travel of the vehicle based on a circuit mode entry signal input from the guide controller 130. For example, upon recognizing that the vehicle arrives at the circuit and enters the circuit mode from the circuit mode entry signal (circuit mode entry on signal) input from the guide controller 130, the system controller 140 may release or change a limit value of the vehicle system 190 for driving the vehicle, and may change a fail-safe condition for the device or the component of the vehicle system 190.

The vehicle system 190 for driving the vehicle may be a vehicle driving system including a driving device (e.g., engine, driving motor, or engine and driving motor) configured to drive the vehicle. In the case of an electric vehicle, the vehicle system 190 may be a power electric (PE) system including a driving motor, an inverter for driving and controlling the driving motor, and a battery connected to the driving motor through the inverter so that the battery may be charged and discharged.

The guide controller 130 outputs circuit-related information suitable for the current travel state of the vehicle through the output device of the input/output unit 180 to guide the driver based on the current location information of the vehicle input from the vehicle location recognition unit 110 and the vehicle driving state and the travel state information input from the travel state determination unit 120.

An example configuration of the system for performing the circuit mode has been described in detail with reference to FIG. 1. A method for performing the circuit mode is described in more detail below.

Figure 2:
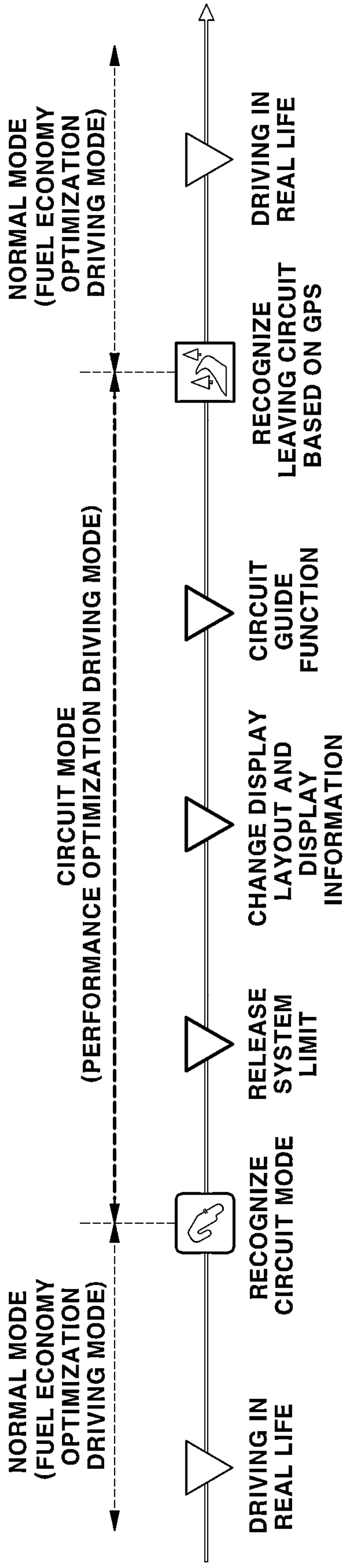
FIG. 2 is a diagram for describing a process in which a vehicle switches from a normal mode in normal times to a circuit mode when entering a circuit and then switches back to the normal mode, according to an embodiment of the present disclosure.

FIG. 2 is a diagram for describing a process in which a vehicle switches from a normal mode in normal times to the circuit mode when entering the circuit and then switches back to the normal mode, according to an embodiment of the present disclosure.

Figure 3:
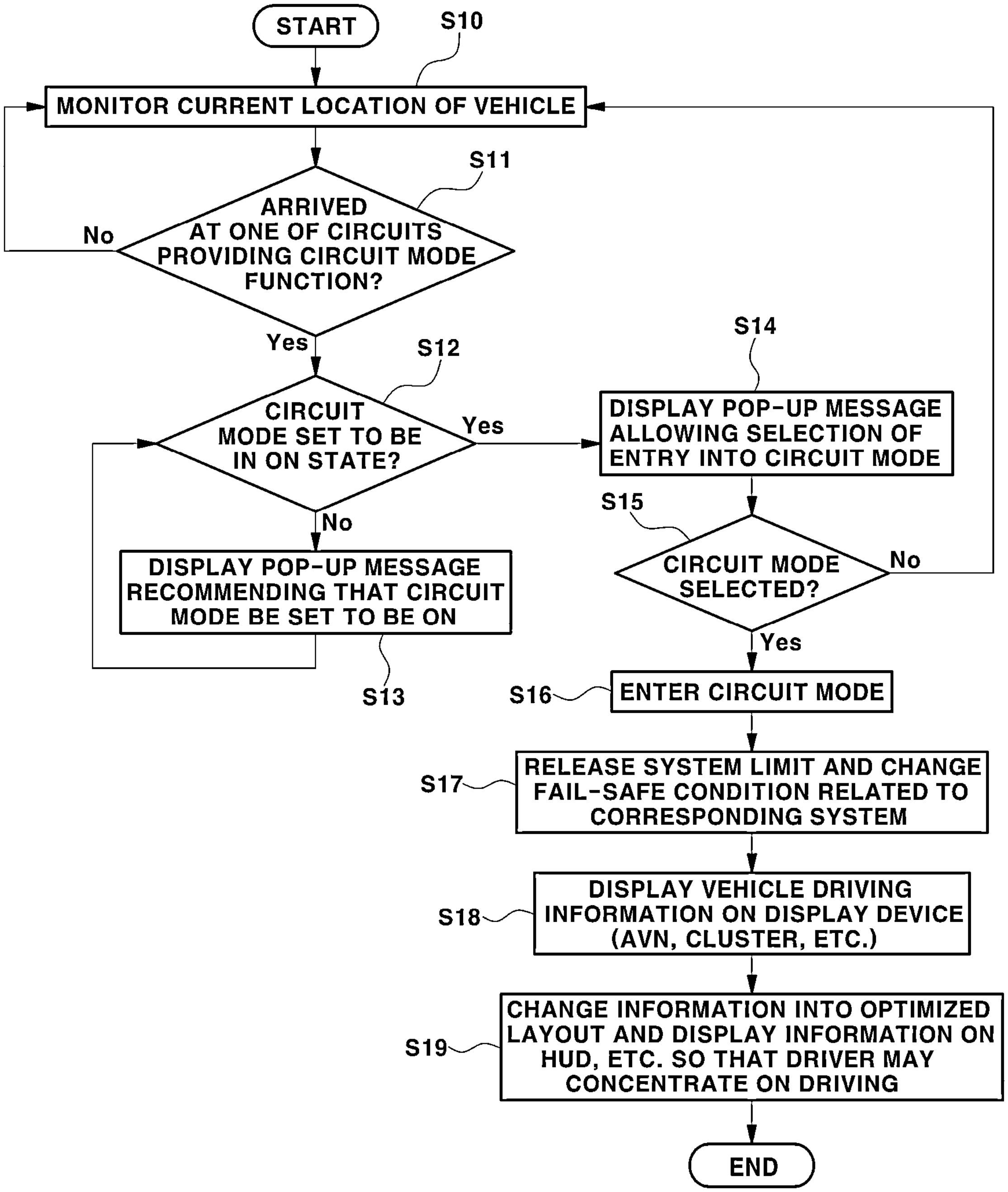
FIGS. 3 and 4 are flowcharts illustrating a process for performing a circuit mode in a vehicle, according to an embodiment of the present disclosure.
Figure 4:
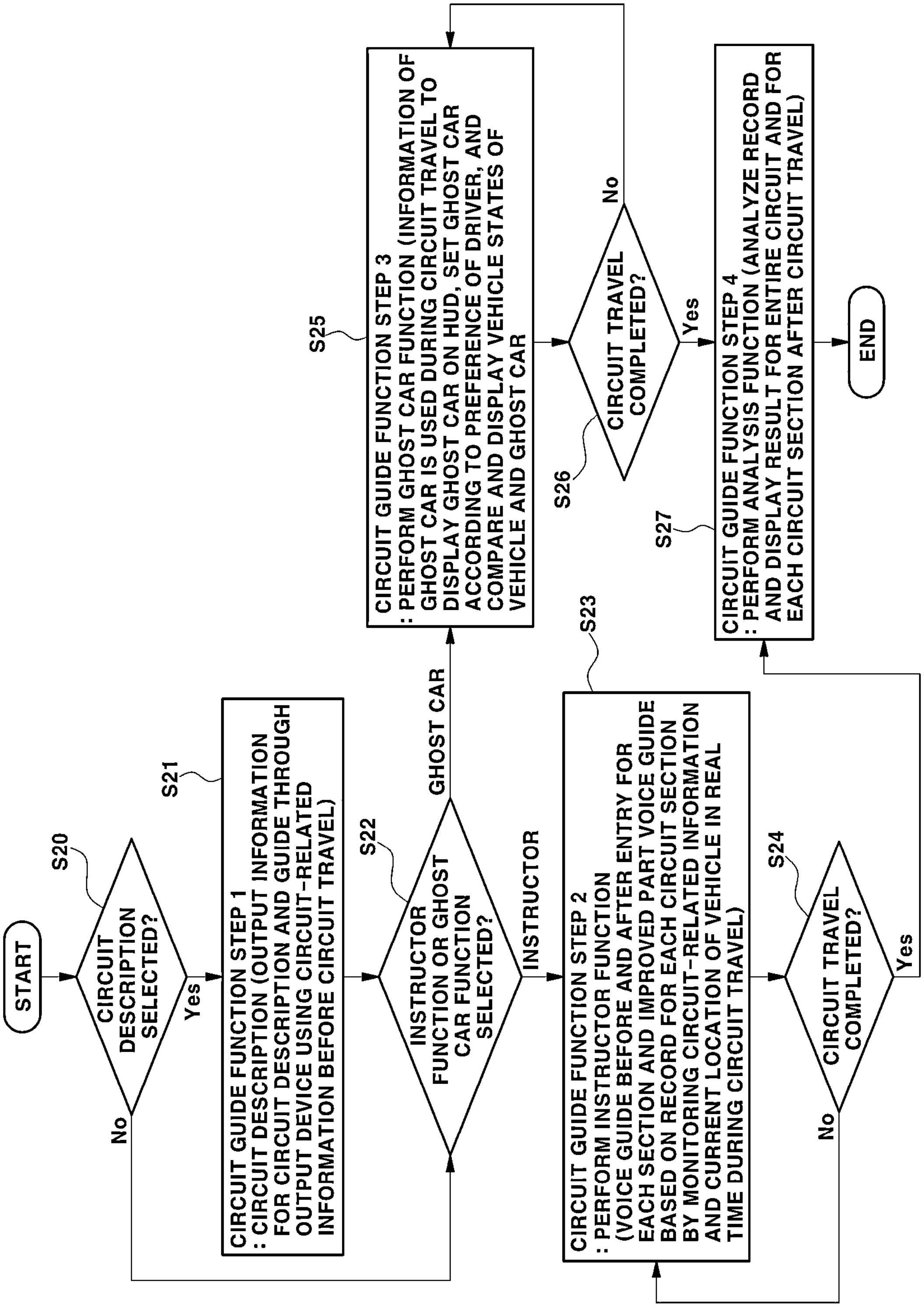

FIGS. 3 and 4 are flowcharts illustrating a process for performing the circuit mode in a vehicle, according to an embodiment of the preset disclosure. FIG. 3 illustrates a process of recognizing the circuit mode in the vehicle, according to an embodiment of the present disclosure. FIG. 4 illustrates a process of performing a circuit guide function, according to an embodiment of the present disclosure.

The normal mode refers to a normal driving mode in real life, and may be a normal fuel economy optimization driving mode in which fuel economy optimization control is performed. The circuit mode is a driving mode when the vehicle enters the circuit, and may be referred to as a performance optimization driving mode in which performance optimization control is performed.

Referring to FIG. 3, in an operation S100, the vehicle location recognition unit 110 of the controller 100 determines and recognizes the current location of the vehicle based on a signal received and input through the communication unit 160. In addition, the vehicle location recognition unit 110 provides current location information of the monitored vehicle to the guide controller 130 of the controller 100 in real time.

In an embodiment, when the vehicle travels on a general road and arrives at the circuit, which is a designated racing road, the controller 100 of the vehicle recognizes the circuit mode. In an operation S11, the guide controller 130 of the controller 100 determines whether the current vehicle has arrived at one of circuits providing a circuit mode function based on stored circuit-related information or circuit-related information received and input from the service providing server 200 or the add-on device 300, e.g., the vehicle external device, through the communication unit 160 (for example, the communication device of the AVN system).

As described above, the guide controller 130 may determine whether the currently arrived circuit is a circuit providing the circuit mode function based on the circuit location information in the circuit-related information together with the current location information of the vehicle input from the vehicle location recognition unit 110.

In an operation S12, the guide controller 130 verifies whether the driver has set the circuit mode to be on in the USM. When the vehicle has arrived at the circuit and the driver has set the circuit mode to be on, in an operation S14, the guide controller 130 of the controller 100 causes a guide message, which allows entry of the circuit mode to be selected or input, to be displayed on the display device of the input/output unit 180 so that the driver may select entry of the circuit mode. The guide message may be expressed in the form of a pop-up message.

On the other hand, when the circuit mode is not on, in an operation S13, the guide controller 130 causes a guide message, which recommends that the circuit mode be set to be on in the USM and guides the driver, to be displayed on the display device of the input/output unit 180. The guide message may be expressed in the form of a pop-up message.

In an operation S15, the guide controller 130 verifies whether the driver has selected entry into the circuit mode. Upon determining that entry into the circuit mode has been selected by the driver, in an operation S16, the guide controller 130 causes the vehicle system 190 to enter the circuit mode through the system controller 140.

In an operation S17, after confirming entry into the circuit mode (confirming the circuit mode entry on signal), the system controller 140 releases limit of the vehicle system 190 or changes a limit state to be able to maximize use of the PE system or the operation of the drive system and maximize fun driving.

In addition, the system controller 140 changes a fail-safe condition for a device or a part of the vehicle system 190 when releasing or changing the limit of the vehicle system 190 as described above.

In an operation S18, in a state where the vehicle enters the circuit, the guide controller 130 may cause real-time vehicle driving information required during circuit driving to be output through the output device of the input/output unit 180.

The guide controller 130 may cause vehicle state information or driver driving input information collected from the vehicle, vehicle performance-related information, etc. to be displayed through the cluster, the display device of the AVN system, and the HUD.

For example, at least one of engine oil temperature (an internal combustion engine vehicle and a hybrid vehicle), battery temperature (a hybrid vehicle and a pure electric vehicle), driving motor temperature (a hybrid vehicle and a pure electric vehicle), coolant temperature for each part, or lateral and longitudinal G-force may be displayed.

In addition, at least one of known important factors in circuit travel such as vehicle speed, rotational speed of the driving device (engine RPM and driving motor RPM), torque of the driving device (which may be a command value), turbo operating state, power, lap time information, gear location (gear position), throttle state, APS value, BPS value, steering angle, brake pressure, or tire pressure may be displayed.

In displaying the above information, in an operation S19, the guide controller 130 may change display information on the display device of the input/output unit 180, such as the HUD, into a layout set in an optimized circuit mode where the driver may concentrate on driving, and display the layout set.

The guide controller 130 of the controller 100 may perform the circuit guide function by performing control in cooperation with other components in the controller 100. The circuit guide function may refer to a function of outputting predetermined guide information related to circuit travel and the circuit mode of the vehicle through the output device of the input/output device 180 (e.g., one or both of the display device and the sound output device) before, during, or after circuit travel, providing the guide information to the driver, and guiding the driver.

The circuit guide function may include a circuit description function, an instructor function, a ghost car function, and an analysis function.

In an operation S20, the guide controller 130 of the controller 100 displays a guide message allowing the driver to select a circuit description function through the display device of the input/output unit 180, verifies whether the driver has selected the circuit description function. In an operation S21, the guide controller 130 performs the circuit description function when the circuit description function is selected.

In the circuit description function, information for describing the circuit and guiding the driver using the circuit-related information before circuit travel may be output through the output device of the input/output unit 180. When the driver does not select the circuit description function, the circuit description function may be omitted, and the instructor function or the ghost car function may be performed.

In this way, when the circuit description function is not selected or a circuit description process is finished, the guide controller 130 of the controller 100 displays a guide message allowing the driver to select one of the instructor function and the ghost car function through the display device of the input/output unit 180.

In an operation S22, the guide controller 130 verifies whether the driver has selected the instructor function or the ghost car function. In an operation S23, the guide controller 130 causes the instructor function to be performed upon determining that the driver has selected the instructor function. In the instructor function, among the output devices of the input/output unit 180, the sound output device including the vehicle speaker may be additionally used along with the display device.

In the instructor function, a voice guide function for reporting situations before and after vehicle entry for each circuit section may be performed based on circuit-related information including circuit section information during circuit travel and real-time location information of the vehicle.

In some embodiments, a voice guide function providing voice information for record improvement based on a record for each circuit section may be performed during circuit travel. Each circuit is pre-divided into a plurality of circuit sections. In this instance, the circuit-related information may include start location and end location information of each circuit section.

Accordingly, a voice guide function of outputting and providing voice information for each circuit section constituting the corresponding circuit may be performed. While performing this instructor function, in an operation S24, the guide controller 130 may determine whether circuit travel has been completed. In an operation S2, when circuit travel is completed, an analysis function may be performed by the guide controller 130.

In an operation S25, the guide controller 130 enables the ghost car function to be performed upon determining that the driver has selected the ghost car function rather than the instructor function. In the ghost car function, a ghost car may be displayed on the HUD to provide the driver with the same feeling as actual vehicle racing during circuit travel. In an embodiment, an augmented reality HUD (AR HUD) displaying various information as an augmented reality image may be used as the HUD.

The ghost car may be a virtual vehicle serving as a reference to the driver. In the ghost car function, the virtual vehicle serving as a reference may be displayed using a display device, for example, the augmented reality HUD. In this ghost car function, the ghost car may be regarded as a vehicle set to have a similar feeling to a ghost by adjusting transparency on the display so as not to interfere with driving of the driver.

In the ghost car function, the ghost car may be displayed using the vehicle information of the ghost car. In embodiments, real-time location information of the subject vehicle input from the vehicle location recognition unit 110, real-time vehicle state information of the subject vehicle acquired and then input through the driving information detector 170 from the travel state determination unit 120, circuit-related information received from the service providing server 200, etc. may be additionally used and compared with vehicle information of the ghost car, and then the ghost car may be displayed.

In some embodiments, information such as a record line, vehicle condition information, and comparison values between drivers may be displayed, which may help shorten recording. In some embodiments, the driver may input and change a display state or form of the ghost car and other set values related to the ghost car through the input device of the input/output unit 180 according to preference of the driver.

While performing the ghost car function, in an operation S26, the guide controller 130 determines whether circuit travel has been completed. When circuit travel has been completed, in an operation S27, an analysis function may be performed by the guide controller 130.

In the circuit guide function, the analysis function may be a function for analyzing the entire circuit record (lap time) and the circuit section record (section time) after circuit travel. The entire record and the record for each section may be displayed and shown to the driver through the display device of the input/output unit 180 in the vehicle, or a current record may be compared with previous records of the driver and shown. In some embodiments, the service providing server 200 may compare a record with records of other drivers received through the communication unit 160 and show the record.

In the analysis function, the entire circuit record, record and travel results for each circuit section, record analysis, and vehicle movement route and vehicle driving information (vehicle state information) of the entire circuit and for each circuit section may be compared with records of other drivers, vehicle movement routes of other drivers, and vehicle driving information (vehicle state information), and a comparison result may be displayed on the display device of the input/output unit 180.

In an embodiment, in addition to integrating information for each circuit section in the analysis function, it is possible to guide the driver through an optimal route and driving skill to shorten the record by using artificial intelligence (AI) technology.

In an embodiment, the guide controller 130 of the controller 100 may determine when the vehicle leaves the circuit based on the current location information of the vehicle input from the vehicle location recognition unit 110 and the circuit location information received and input from the service providing server 200 or the add-on device 300 through the communication unit 160.

In this way, upon determining that the vehicle has left the circuit, the guide controller 130 releases the circuit mode and switches the vehicle system 190 to a normal mode, which is a normal real-life driving mode.

In embodiments, according to the system for performing the circuit mode of the vehicle described above, delivering necessary and helpful information and providing the circuit guide function to the driver during circuit travel has effects of increasing understanding of the vehicle and the circuit of the driver, satisfying desire for speed competition and fun driving of the driver, and further improving marketability of the vehicle.

Figure 5:
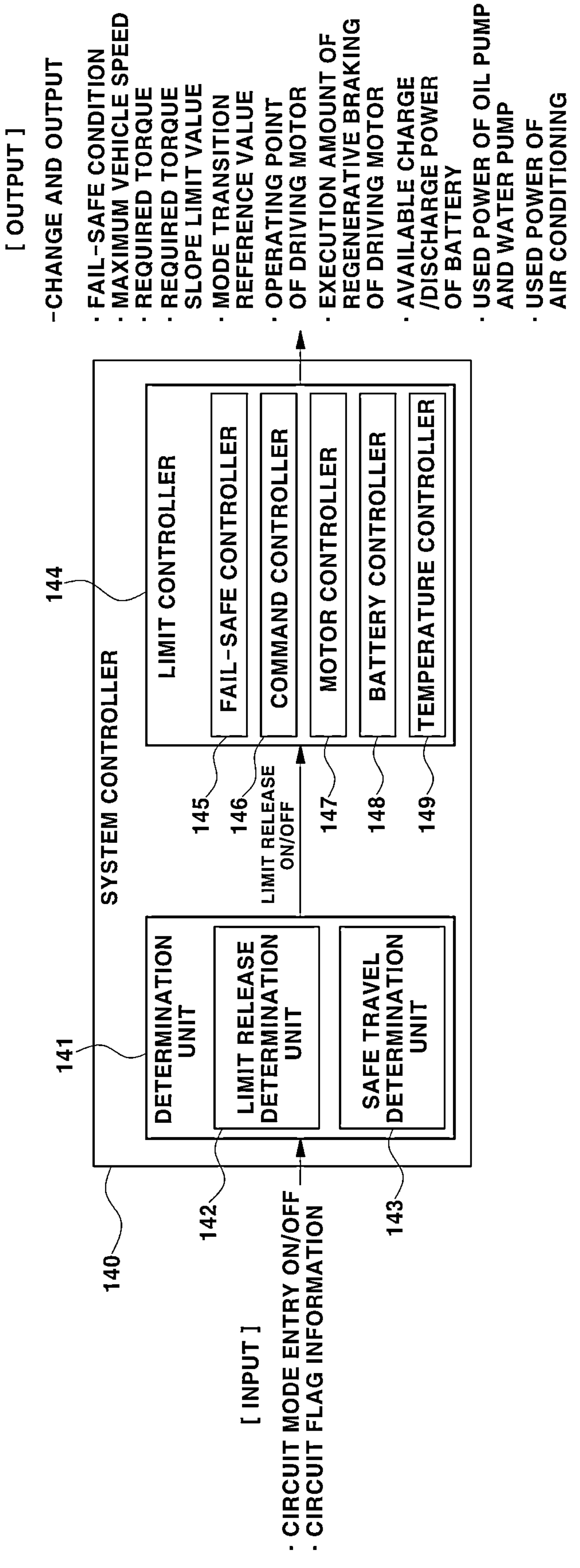
FIG. 5 is a block diagram illustrating a configuration of a system controller configured to perform limit control of a vehicle system, according to an embodiment of the present disclosure.
Figure 6:
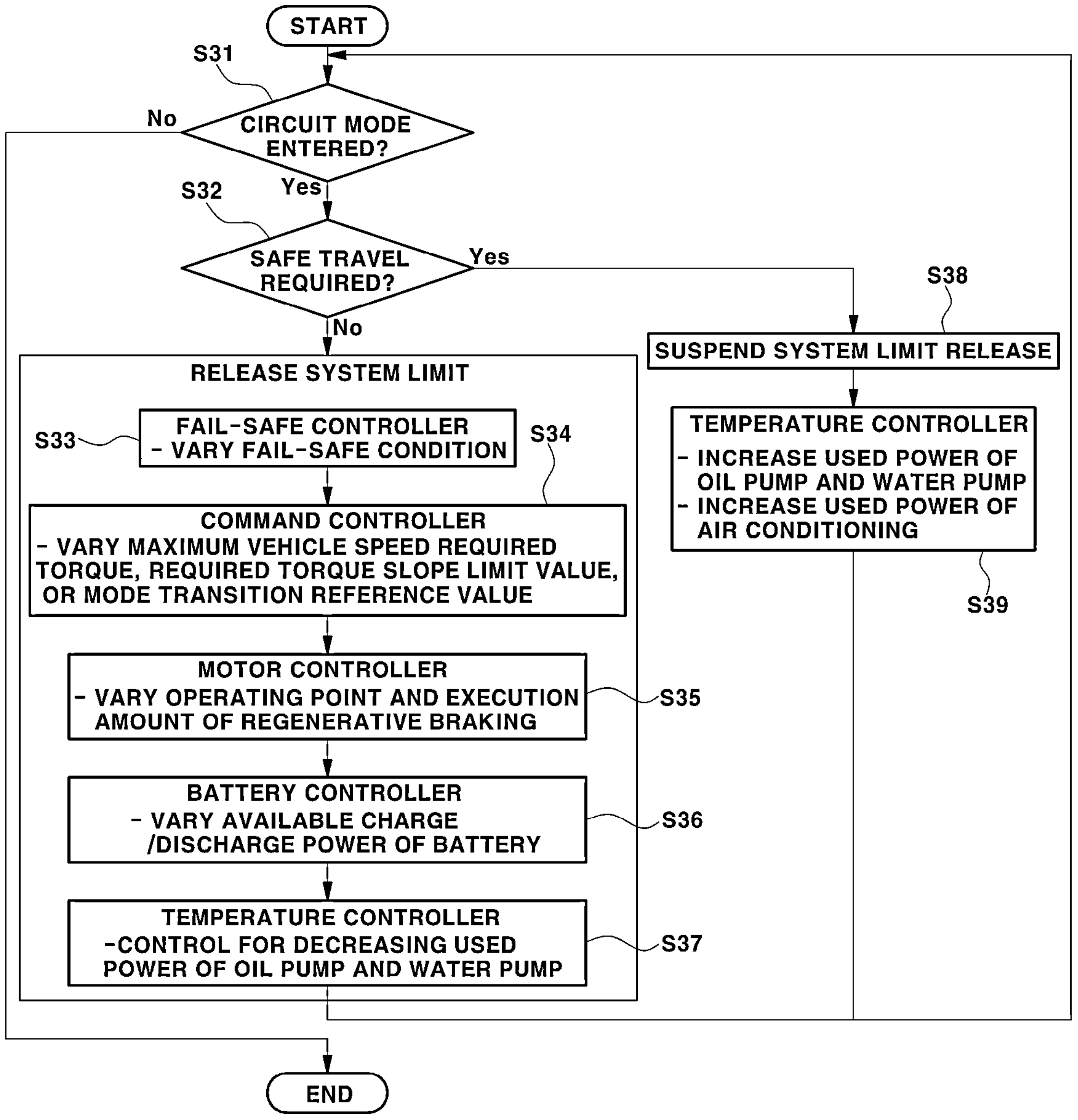
FIG. 6 is a flowchart illustrating a process of performing limit control of a vehicle system, according to an embodiment of the present disclosure.

FIG. 5 is a block diagram illustrating a configuration of a system controller configured to perform limit control of the vehicle system, according to an embodiment of the present disclosure. FIG. 6 is a flowchart illustrating a process of performing limit control of the vehicle system, according to an embodiment of the present disclosure.

The system controller 140 includes a determination unit 141 and a limit controller 144. The determination unit 141 may receive a signal indicating whether to enter the circuit mode, e.g., a circuit mode entry on/off signal, from another component in the controller 100.

For example, the determination unit 141 of the system controller 140 may receive input of a circuit mode entry on signal and a circuit mode entry off signal from the guide controller 130 in the controller 100.

Further, the determination unit 141 may receive input of racing flag (circuit flag) information during circuit travel. The racing flag information may be information that allows a flag waved by a racing operator such as a referee to be distinguished during a race in which the vehicle travels on the circuit in the circuit mode, for example, information that allows a type of flag, such as color, design, pattern, etc. to be identified.

Accordingly, the system for performing the circuit mode of the vehicle may further include a detection element for obtaining information indicating the type of flag currently waved by the racing operator in the vehicle, as one of vehicle-mounted devices mounted in the vehicle.

In an embodiment of the present disclosure, the racing flag information indicating the type of the current racing flag is information that may be visually distinguished and checked. Thus, the detection element for obtaining the racing flag information may include a camera 171 configured to photograph a flag waved by the racing operator at a predetermined location on the circuit and input photographed image information to the controller 100.

In an embodiment of the present disclosure, the flag is provided as a signal informing the driver of a current racing situation, and the type of flag may be those used in normal car racing. In general, various flags are used to inform drivers of racing-related situation information, states of racing vehicles, a road state, etc.

For example, it is possible to use a green flag indicating start of a race, the end of a dangerous situation, restart of a race, etc., a red flag indicating suspension of racing, a yellow flag prohibiting overtaking when a dangerous situation has occurred on the circuit, a checkered flag signaling the end of a race, a blue flag, a white flag, a black flag, a striped flag, a half-black half-white flag, an orange ball flag, etc.

As illustrated in FIG. 5, in an embodiment of the present disclosure, the determination unit 141 of the controller 100 may receive input of an image captured by the camera 171 as racing flag information and determine a type of flag, or the determination unit 141 may cause the travel state determination unit 120 or the guide controller 130, which may be components in the controller 100, to receive input of racing flag information indicating a type of flag obtained from a video signal of the camera.

Further, in an embodiment of the present disclosure, the determination unit 141 may include a limit release determination unit 142 and a safe travel determination unit 143. The limit release determination unit 142 determines whether system limit release is necessary, and the criteria for determination are whether to enter the circuit mode and whether safe travel is required.

In an embodiment, whether or not safe travel is necessary is racing situation information in the circuit acquired in real time while racing on the circuit is in progress after the vehicle enters the circuit mode. The racing situation information may be determined by the safe travel determination unit 143.

Referring to FIG. 6, in an operation S31, the limit release determination unit 142 verifies whether the circuit mode is entered. In an operation S32, the limit release determination unit 142 verifies whether safe travel is required. In an embodiment, the limit release determination unit 142 generates and outputs one of a limit release on signal for releasing or changing vehicle system limit and a release off signal for maintaining limit of the vehicle system, suspending limit release, or changing a limit condition.

The limit release on signal may be a signal for releasing limit of the vehicle system or changing the limit condition of the vehicle system from a limit condition of the normal mode to a limit condition of the circuit mode.

The limit release off signal may be a signal for maintaining the limit of the vehicle system without releasing the limit, a signal for suspending limit release of the vehicle system and performing the limit of the vehicle system again, or a signal for performing the limit of the vehicle system by changing the limit condition of the vehicle system from the limit condition of the circuit mode to the limit condition of the normal mode again.

In an embodiment of the present disclosure, in the case of a circuit mode entry on state in which the vehicle enters the circuit mode and a safe travel off state in which safe travel is unnecessary and thus is not performed, the limit release determination unit 142 generates and outputs a limit release on signal to release the limit of the vehicle system or change the limit condition of the vehicle system.

On the other hand, in the case of the circuit mode entry on state in which the vehicle enters the circuit mode and a safe travel on state in which safe travel is necessary, the limit release determination unit 142 generates and outputs a limit release off signal to maintain a normal limit condition for the normal mode, a limit release off signal for suspending limit release of the vehicle system and performing limit of the vehicle system again, or a limit release off signal to change the limit condition of the vehicle system from the limit condition of the circuit mode to the limit condition of the normal mode.

When the vehicle is not in a circuit mode entry state and is in a circuit mode entry off state, a process related to the circuit mode is terminated without performing the process of FIG. 6 for system limit release or release suspension.

Referring again to FIG. 5, in an embodiment, circuit mode entry on means the circuit mode entry state. The circuit mode entry on signal may be a circuit mode entry signal, i.e., a signal indicating a state in which the circuit mode is entered.

Circuit mode entry off means that the vehicle has not entered the circuit mode or the circuit mode has been released. The circuit mode entry off signal may be a signal indicating a state in which the circuit mode is not entered or a state in which the circuit mode is released.

In an embodiment, safe travel on/off is determined by the safe determination travel unit 143. The safe travel on state means a safe travel required state in which the driver requires safe travel, and the safe travel off state means a state in which the driver does not require safe travel.

The safe travel determination unit 143 may determine whether safe travel is required based on a current racing flag type, and may generate and output one of a safe travel on signal indicating a state in which safe travel is required and a safe travel off signal indicating a state in which safe travel is unnecessary.

In an embodiment of the present disclosure, when the type of racing flag determined from an image captured by the camera is a red flag or a yellow flag, the safe travel determination unit 143 determines that safe travel is required and outputs a safe travel on signal.

During normal racing, when a flag on the circuit is a red flag or a yellow flag, the flag indicates an emergency situation and danger ahead, and thus the driver needs to slow down and should not overtake another vehicle when checking the flag.

Accordingly, in the case of confirming that the red flag or the yellow flag is detected as a type of flag waved by the racing operator such as the referee from racing flag information, the safe travel determination unit 143 may output a safe travel on signal indicating a state in which safe travel is required. On the other hand, in the case of confirming that the green flag or the blue flag is detected, a safe travel off signal indicating a state in which safe travel is unnecessary may be output.

Referring back to FIG. 6, the limit controller 144 receives, from the determination unit 141, input of the limit release on signal for releasing the limit state of the vehicle system or changing the limit state to a limit condition of the circuit mode, and the limit release off signal for maintaining the limit state, suspending limit release, or changing to the limit condition of the normal mode in the circuit mode.

In operations S33 to S37, the limit controller 144 performs system limit release control for releasing the limit state of the vehicle system for vehicle driving or changing the system limit state when the limit release on signal is input from the determination unit 141. In operations S38 and S39, the limit controller 144 performs system limit control for suspending limit release of the system or changing the system limit state when the limit release off signal is input from the determination unit 141.

In an embodiment of the present disclosure, the limit controller 144 may include a fail-safe controller 145, a command controller 146, a motor controller 147, a battery controller 148, and a temperature controller 149.

Figure 7A:
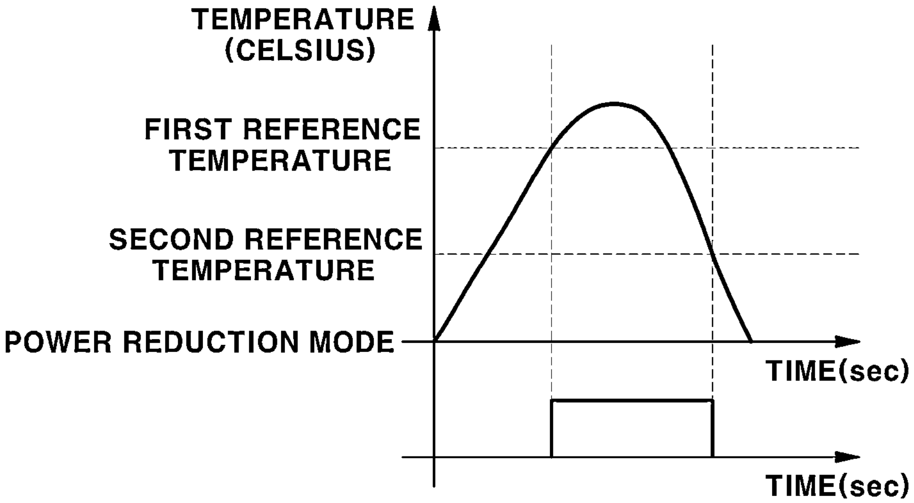
FIGS. 7A-B are diagrams illustrating, respectively, before and after changing a fail-safe condition, according to an embodiment of the present disclosure.
Figure 7B:
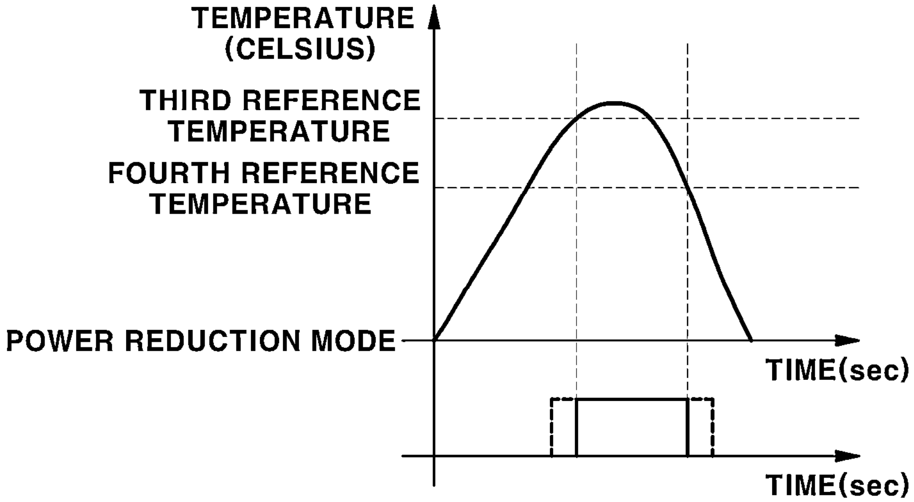

FIGS. 7A-B are diagrams illustrating before and after changing the fail-safe condition, according to an embodiment of the present disclosure. FIG. 7A illustrates a state before changing the fail-safe condition, according to an embodiment. FIG. 7B illustrates a state after changing the fail-safe condition, according to an embodiment.

The fail-safe controller 145 receives input of a limit release on/off signal from the determination unit 141, changes a fail-safe condition for a device or a part of the vehicle system according to a limit release on/off state as illustrated in FIGS. 7A-B, and outputs the changed fail-safe condition so that the changed fail-safe condition may be applied.

In an embodiment of the present disclosure, the fail-safe condition may be an output limit condition for a device or a part of the vehicle system. For example, the fail-safe condition may include an entry criterion for determining and performing entry into a power reduction (power limit) mode, and a release criterion for determining and performing release of the power reduction mode.

In an embodiment, the fail-safe controller 145 changes the entry criterion and release criterion for the power reduction mode of the vehicle system according to the limit release on/off state.

For example, the fail-safe controller 145 changes an entry condition for entering the power reduction mode and a release condition for releasing the power reduction mode depending on whether limit release is on or off. Referring back to FIG. 6, when limit release on is input, in an operation S33, the output limit condition is changed so that an execution time of the power reduction mode in which the output limit of the vehicle system is made is reduced.

Referring to FIGS. 7A-B, it can be seen that an entry criterion and a release criterion for the power reduction (power limit) mode, for example, both an entry temperature serving as the entry criterion for the power reduction mode and a release temperature serving as the release criterion for the power reduction mode vary according to the limit release on/off state.

FIG. 7A illustrates the entry temperature and the release temperature of the output reduction (output limit) mode during limit release off, and the fail-safe controller 145 uses a first reference temperature during system limit or uses a third reference temperature during limit release as the entry temperature serving as the entry criterion for the power reduction mode, and uses a second reference temperature during system limit or uses a fourth reference temperature during limit release as the release temperature serving as the release criterion for the power reduction mode according to the limit release on/off state.

For example, when the limit release off signal is input from the determination unit 141, in the fail-safe controller 145 of the limit controller 144, the entry temperature and the release temperature of the power reduction mode become the first reference temperature and the second reference temperature, respectively.

FIG. 7B illustrates the entry temperature and the release temperature of the output reduction (output limit) mode when the limit release is turned on. When the limit release on signal is input from the determination unit 141, the entry temperature and the release temperature of the power reduction mode in the fail-safe controller 145 of the limit controller 144 become the third reference temperature and the fourth reference temperature, respectively. The third reference temperature is set to a temperature higher than the first reference temperature, and the fourth reference temperature is set to a temperature higher than the second reference temperature.

In embodiments, a device or a part of the vehicle system subject to the output reduction (power limit) mode may include at least one of a driving motor, which is a driving device that drives the vehicle, or a battery connected to the driving motor through an inverter so that the battery may be charged and discharged.

In embodiments, a state variable for determining entry and release of the power reduction mode may be temperature or battery state of charge (SOC), and the temperature may include at least one of a driving motor temperature or a battery temperature, each of which is detected by a sensor.

When the driving motor temperature becomes equal to or greater than the set entry temperature, the output reduction (output limit) mode for limiting and reducing the output of the driving motor may be entered. When the driving motor temperature becomes equal to or less than the set release temperature, the output limit mode may be released.

Similarly, when the battery temperature becomes equal to or greater than the set entry temperature, the output reduction (output limit) mode for limiting and reducing the output of the battery may be entered, and when the battery temperature becomes equal to or less than the set release temperature, the power reduction mode may be released.

The fail-safe controller 145 may change the entry temperature, which is an entry criterion of the output limit mode, and the release temperature, which is a release criterion, according to the limit release on/off. The fail-safe controller 145 may change the entry temperature from the first reference temperature at the time of system limit to the third reference temperature at the time of limit release when the limit release on signal is input. The fail-safe controller 145 may also change the release temperature from the second reference temperature at the time of system limit to the fourth reference temperature at the time of limit release.

In an embodiment, when the limit release off signal is input, the fail-safe controller 145 may conversely change the entry temperature from the third reference temperature at the time of system limit to the first reference temperature at the time of limit release, and may change the release temperature from the fourth reference temperature at the time of system limit to the second reference temperature at the time of limit release.

In an embodiment, when the battery SOC rapidly decreases, for example when the reduction amount of the battery SOC for a set time becomes equal to or greater than the entry reference amount, the power reduction (output limit) mode for reducing the battery output may be entered, and when the reduction amount of the battery SOC becomes equal to or less than the release reference amount, the output limit mode may be released.

The fail-safe controller 145 may change the entry reference amount, which is the entry criterion of the output limit mode, and the release reference amount, which is the release criterion, according to limit release on/off. When the limit release on signal is input, the fail-safe controller 145 may change the entry reference amount from a first reference amount at the time of system limit to a third reference amount, having a greater value, at the time of limit release. The fail-safe controller 145 may also change the release reference amount from a second reference amount at the time of system limit to a fourth reference amount, having a greater value, at the time of limit release.

When the limit release off signal is input, the fail-safe controller 145 may change the entry reference amount from the third reference amount at the time of limit release to the first reference amount at the time of system limit, and may change the release reference amount from the fourth reference amount at the time of limit release to the second reference amount at the time of system limit.

In an operation S34, the command controller 146 is provided to vary a command value for the limit in the vehicle system according to whether the limit release is on or off. The command value may include at least one of a maximum vehicle speed, required torque, a required torque slope limit value, or an EV-HEV mode transition reference value. Here, the EV-HEV mode transition reference value may include a reference value for torque and a reference value for vehicle speed.

The command controller 146 may change a maximum vehicle speed set as a performance parameter for each vehicle. When the limit release on signal is input, the maximum vehicle speed is changed from a current vehicle speed to a higher vehicle speed among set vehicle speeds (for example, changed from 160 kph at the time of system limit to 200 kph at the time of limit release).

Figure 8:
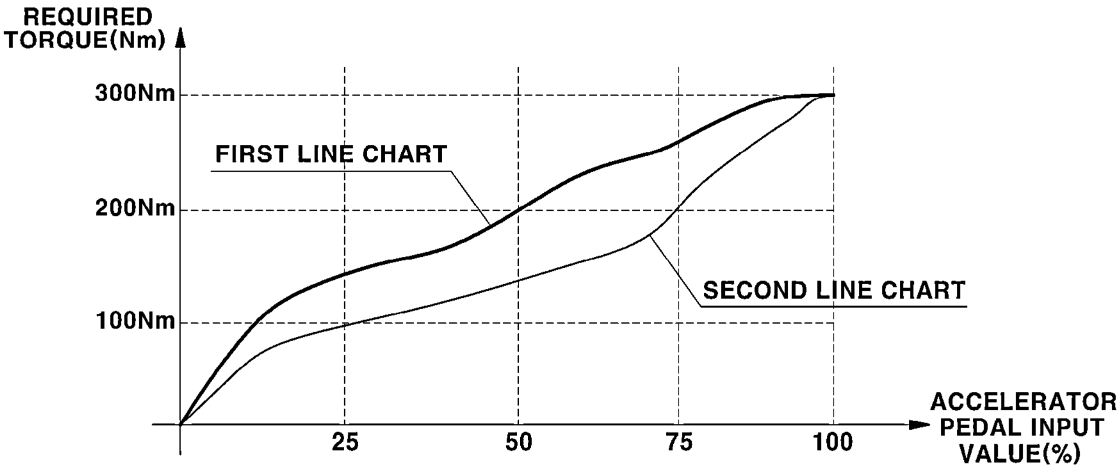
FIG. 8 is a diagram illustrating a change state of required torque (Nm) according to an accelerator pedal input value (%), according to an embodiment of the present disclosure.

In addition, the command controller 146 increases the required torque (output torque) corresponding to the accelerator pedal input value (APS value, %) of the driver to a set value at the time of limit release when limit release is turned on. FIG. 8 is a diagram illustrating a change state of the required torque (Nm) according to the accelerator pedal input value (%), according to an embodiment of the present disclosure.

Referring to FIG. 8, two line charts, each indicating the required torque according to the accelerator pedal input value, are illustrated as setting data defining a correlation between the accelerator pedal input value (%) and the required torque (Nm).

In the command controller 146, depending on whether the limit release is on or off, setting data of one of the two line charts may be selected, and a required torque value corresponding to the current accelerator pedal input value may be selected using the selected setting data. When limit release is on (during limit release), the first line chart is selected, and when limit release is off (during system limit), the second line chart is selected.

In the setting data, the required torque value of the setting data, indicated as "the first line chart" in FIG. 8, selected when the limit release is on is set to a value greater than the required torque value of the setting data, indicated as "the second line chart" in FIG. 8, selected when the limit release is off under the condition of the same accelerator pedal input value.

As shown in FIG. 8, when the limit release on signal is input, the command controller 146 determines a greater value than that when the limit release off signal is input (during system limit) as the required torque even for the same accelerator pedal input value (%).

In addition, the command controller 146 changes and increases a slope limit value of a requires torque change for reaching target required torque (output torque) from the current required torque (output torque) to a greater value among set values when limit release is on.

For example, it is possible to change from a required torque slope limit value enabling change of 10 Nm per 10 ms when limit release is off (during system limit) to a required torque slope limit value enabling change of 30 Nm per 10 ms when limit release is on (during system release).

Figure 9:
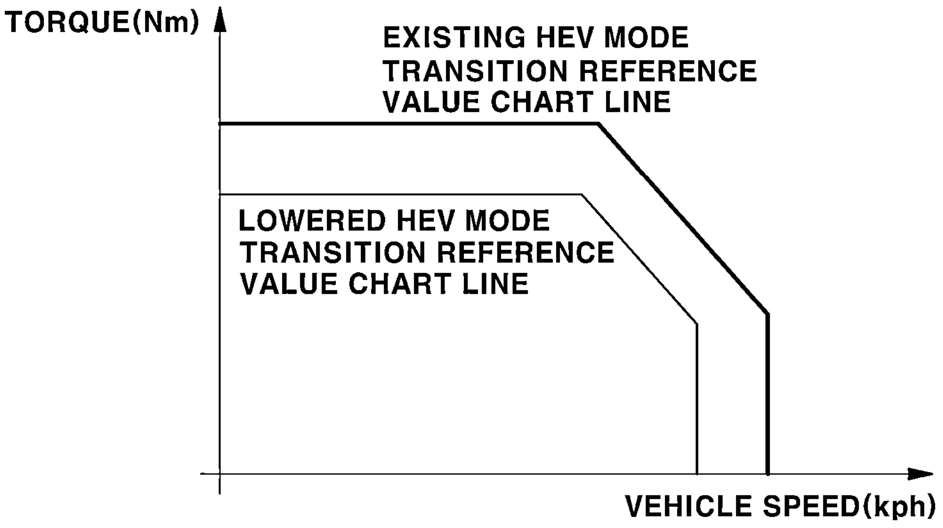
FIG. 9 is a diagram illustrating an EV-HEV mode transition reference value change state according to a limit release on/off state, according to an embodiment of the present disclosure.

FIG. 9 is a diagram illustrating an EV-HEV mode transition reference value change state according to a limit release on/off state, according to an embodiment of the present disclosure. In an embodiment in which the vehicle is a hybrid vehicle (HEV, PHEV), a transition reference value between an EV mode and an HEV mode is lower when limit release is on (during limit release) than when limit release is off (during system limit), thereby ensuring a power source (e.g., engine) that can be additionally provided by the vehicle system in advance.

Referring to FIG. 9, setting data for determining one of the EV mode and the HEV mode according to a vehicle speed (kph) and torque (Nm) in the hybrid vehicle is illustrated. As an example, the setting data may be a chart line of a mode transition reference value set so that transition between the EV mode and the HEV mode may be made, and an EV mode area and an HEV mode area are divided by each line chart for the entire range of the vehicle speed (kph) and torque (Nm).

As shown in FIG. 9, the mode transition reference value of the vehicle speed and torque when the limit release is on may be set to a smaller value than that of the mode transition reference value when the limit release is off.

Referring back to FIG. 6, in an operation S35, the motor controller 147 varies an operating point and the execution amount of regenerative braking of the driving motor, which is a driving device for driving the vehicle, according to the limit release on/off. The operating point of the driving motor may be varied by giving higher priority to output than efficiency of the driving motor.

Figure 10:
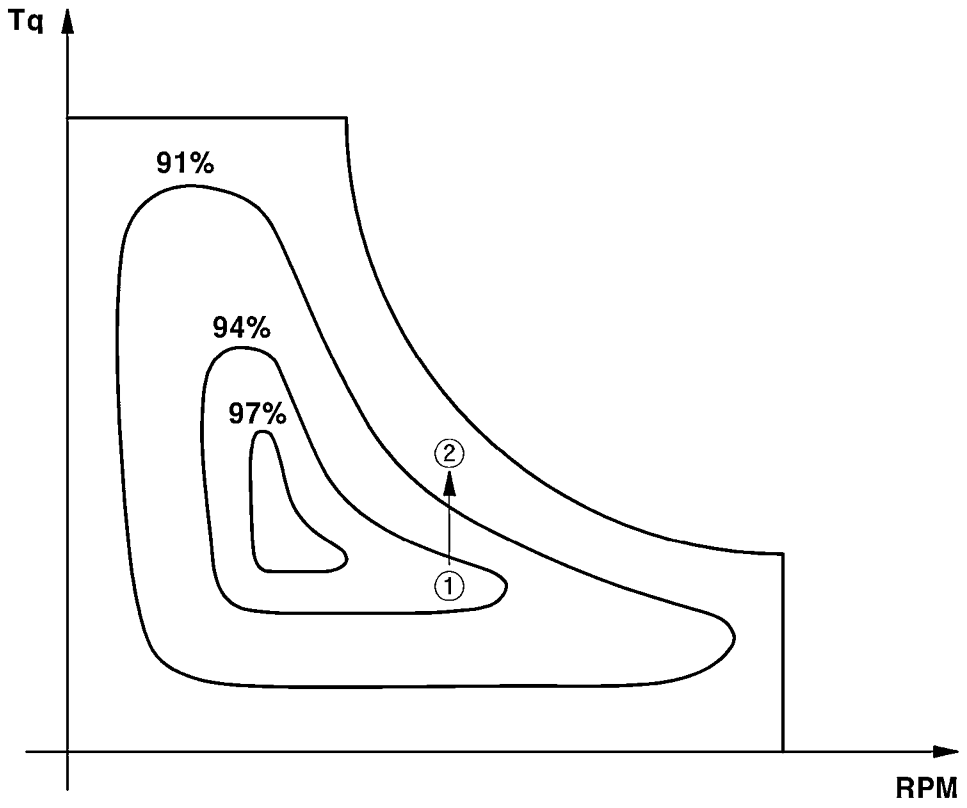
FIG. 10 is a diagram illustrating an example in which an operating point is changed, according to an embodiment of the present disclosure.

FIG. 10 is a diagram showing an example in which an operating point is changed, according to an embodiment of the present disclosure. A horizontal axis represents driving motor speed (Rpm) and a vertical axis represents torque (Tq). In the example of FIG. 10, ① indicates an operating point when limit release is turned off, and ② indicates an operating point when limit release is turned on under the same driving condition.

When limit release is on, operating point variable control is performed to change the operating point from the operating point ① at which efficiency is high and output torque is low to the operating point ② at which efficiency is low and output toque is high. When limit release is off, the operating point ① at which output torque is low and efficiency is high under the same driving condition is selected.

Figure 11:
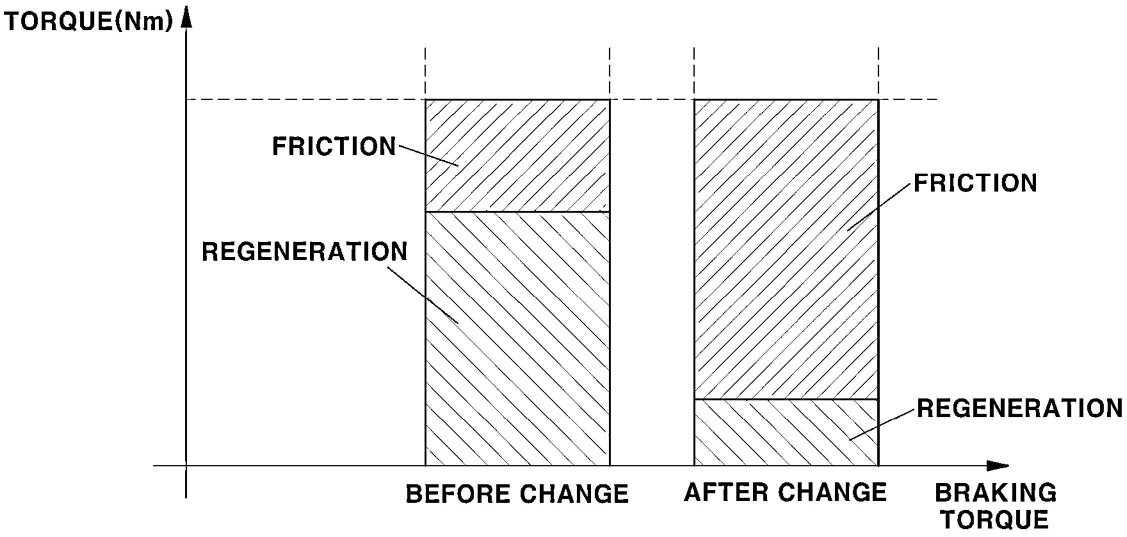
FIG. 11 is a diagram illustrating an example in which the amount of execution of regenerative braking is changed, according to an embodiment of the present disclosure.

FIG. 11 is a diagram illustrating an example in which the execution amount of regenerative braking is changed, according to an embodiment of the present disclosure. When limit release is on, control is performed to reduce the execution amount of regenerative braking, thereby preventing the temperature of the driving motor from rising and preventing reduction of output of the driving motor due to overheating.

In general, during braking of an electrified vehicle, control is performed to satisfy total braking torque determined by a brake controller using a sum of friction braking torque by hydraulic brake and regenerative braking torque by the driving motor.

In an embodiment, the friction braking torque and the regenerative braking torque are distributed according to a predetermined distribution ratio so that the total braking torque required during braking is satisfied using the sum of the friction braking torque and the regenerative braking torque.

According to embodiments of the present disclosure, when limit release is on, the distribution ratio is changed to a set distribution ratio to reduce the regenerative braking torque managed by the driving motor, and instead the friction braking torque is increased to satisfy the total braking torque.

Referring to FIG. 11, it can be seen that, when limit release is on, due to the change of the distribution ratio, the amount of regenerative braking torque (execution amount of regenerative braking) for satisfying the total braking torque is reduced compared to when limit release is off before the change, and instead the friction braking torque is increased.

Referring again to FIG. 6, in an operation S36, the battery controller 148 varies available charge/discharge power of a high-voltage battery of the vehicle according to limit release on/off.

In general, the charge/discharge power of the battery is determined by the battery SOC and temperature. However, for specific control, control is performed to leave a certain amount of battery charge/discharge power.

For example, in the case of the hybrid vehicle (HEV, PHEV), a certain amount of extra battery power for driving a motor for engine cranking, e.g., an HSG (Hybrid Starter Generator), that is a starter generator connected to the engine to enable transmission of power, is left.

For example, when actual discharge power that may currently be output from the high-voltage battery is 100 KW, available discharge power determined by an upper controller may be 90 KW, and extra discharge power determined to be needed may be 10 KW.

According to embodiments of the present disclosure, extra charge/discharge power is left as described above only when limit release is off, and when limit release is on, limit for leaving charge/discharge power of the battery as an extra is released for specific control. Through this battery charge/discharge power limit release, more battery power is allowed to be used in the driving motor.

Figure 12:
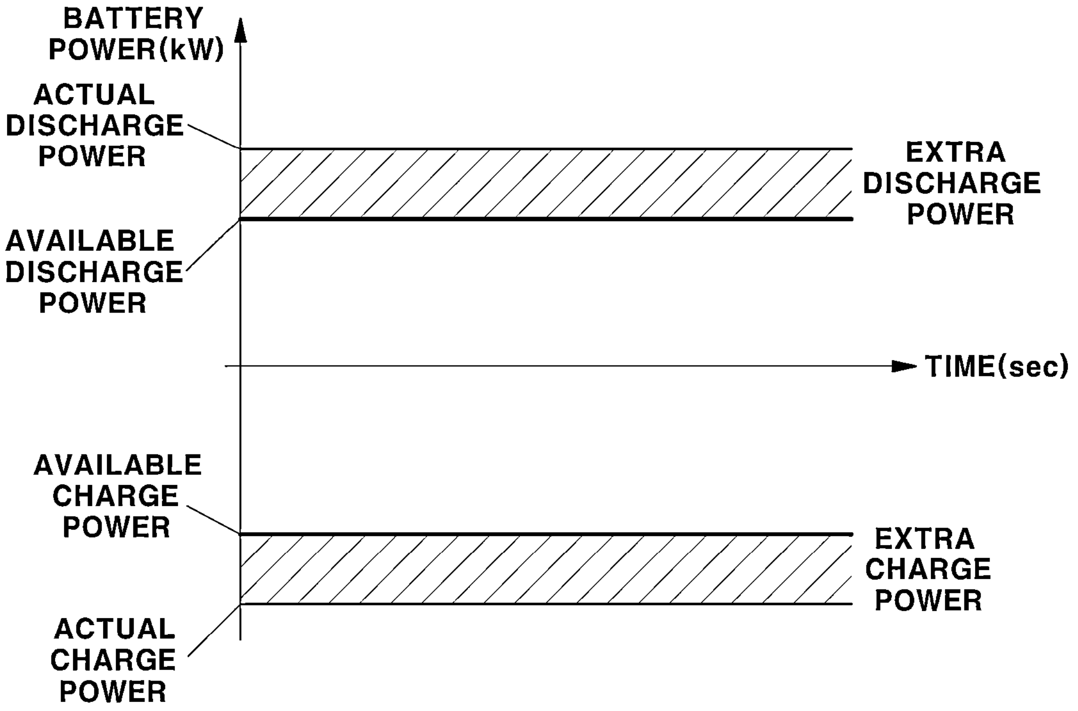
FIG. 12 is a diagram illustrating battery charge/discharge power, according to an embodiment of the present disclosure.

FIG. 12 is a diagram illustrating battery charge/discharge power according to an embodiment of the present disclosure. The diagram of FIG. 12 shows actual charge/discharge power, available charge/discharge power, and extra charge/discharge power when limit release is off.

Referring back to FIG. 6, the temperature controller 149 varies cooling power and air conditioning used power of PE parts of the vehicle according to a limit release on/off state. That is, used power of at least one of an electric oil pump (EOP), an electric water pump (EWP), or a vehicle air conditioning system is varied.

When limit release is on, power limit may be performed in which used power of the EOP or the EWP in the vehicle system is reduced compared to when limit release is off (during system limit), or used power of the vehicle air conditioning system in the vehicle system is reduced compared to when limit release is off. Thus, in an operation S37, ensured power is used to increase output torque of the motor.

In addition, safe travel is in an on state, i.e., limit release is off while the circuit mode is entered, and the limit controller 144, in an operation S38, maintains the system limit state, suspends system limit release, or changes the limit condition of the vehicle system to the limit condition of the normal mode.

When limit release is off, in an operation S39, the temperature controller 149 of the limit controller 144 performs upward control to increase used power of the EOP or the EWP to improve a cooling speed of the PE part, and increases used power of the vehicle air conditioning system to be able to maintain and control an internal vehicle temperature at a temperature set by the driver.

Thus, according to a method of controlling system limit of the vehicle according to embodiments of the present disclosure, the vehicle system may be limited in a more differentiated manner in conjunction with the circuit mode in the vehicle in which the circuit mode enabling circuit travel and experience may be performed by the general driver using the vehicle of the general driver.

Even though embodiments of the present disclosure have been described in detail above, the scope of the present disclosure is not limited thereto, and various modifications and improvements by those having ordinary skill in the art using the basic concept of the present disclosure as defined in the following claims are also included in the scope of the present disclosure.

What is claimed is:

1. A method of controlling system limit of a vehicle performing a circuit mode, the method comprising:

determining, by a controller, whether the vehicle arrives at a circuit and enters the circuit mode;

determining, by the controller, whether safe travel is required based on racing situation information, acquired from video information captured by a camera of the vehicle during travel of the vehicle in the circuit, upon determining that the vehicle enters the circuit mode; and performing, by the controller, system limit release control for releasing a limit state of a vehicle system for vehicle driving upon determining, by the controller, that the safe travel is unnecessary based on the racing situation information acquired from the video information captured by the camera of the vehicle during travel of the vehicle in the circuit, wherein performing the system limit release control includes changing and applying a fail-safe condition for a device or a part of the vehicle system, wherein:

the fail-safe condition comprises an entry criterion for determining and performing entry of a power reduction mode for limiting output of a device or a part of the vehicle system and a release criterion for determining and performing release of the power reduction mode, the device or the part of the vehicle system comprises at least one of a driving motor configured to drive the vehicle, or a battery connected to the driving motor through an inverter so that the battery is allowed to be charged and discharged, a state variable for determining entry and release of the power reduction mode according to the entry criterion and the release criterion is a temperature or a battery state of charge (SOC), the entry criterion and the release criterion of the power reduction mode are an entry reference amount and a release reference amount of the power reduction mode for a reduction amount of the battery SOC, and performing the system limit release control comprises changing the entry reference amount and the release reference amount to higher values than values during system limit.

2. The method of claim 1, wherein determining whether the vehicle enters the circuit mode includes:

recognizing, by the controller, a current location of the vehicle by receiving input of a GPS signal received through a GPS receiver of the vehicle or a signal related to a vehicle location received from a vehicle external device through a communication unit of the vehicle, and determining, by the controller, that the vehicle arrives at the circuit based on the recognized current location of the vehicle and circuit location information.

3. The method of claim 2, further comprising, upon determining that entry into the circuit mode is selected by a driver in addition to determining that the vehicle arrives at the circuit, determining, by the controller, that the vehicle enters the circuit mode.

4. The method of claim 1, wherein determining whether the safe travel is required comprises determining, by the controller, whether the safe travel is required based on racing flag information acquired during travel of the vehicle in the circuit as racing situation information in the circuit.

5. The method of claim 4, further comprising, when a current racing flag is a green flag or a blue flag from the racing flag information acquired from video information captured by the camera of the vehicle, determining, by the controller, that the safe travel is unnecessary.

6. The method of claim 1, wherein the vehicle system is a vehicle driving system comprising a driving device configured to drive the vehicle.

7. The method of claim 1, wherein the vehicle system is a power electric (PE) system comprising a driving motor configured to drive the vehicle, an inverter configured to drive and control the driving motor, and a battery connected to the driving motor through the inverter so that the battery is allowed to be charged and discharged.

8. The method of claim 1, wherein;

the temperature among the state variables comprises at least one of a driving motor temperature or a battery temperature detected by sensors.

9. The method of claim 1, wherein:

the entry criterion and the release criterion of the power reduction mode are an entry temperature and a release temperature of the power reduction mode for at least one of the driving motor temperature or the battery temperature, and performing the system limit release control comprises changing the entry temperature and the release temperature to higher temperatures than temperatures during system limit and applying the temperatures.

10. The method of claim 1, wherein:

the vehicle system is a vehicle driving system comprising a driving device configured to drive the vehicle, performing the system limit release control comprises varying a command value for limit of the vehicle system, and the command value comprises at least one of a maximum vehicle speed, required torque, a required torque slope limit value, or an EV-HEV mode transition reference value.

11. The method of claim 10, wherein performing the system limit release control comprises at least one of:

changing the maximum vehicle speed to a speed higher than a maximum vehicle speed during system limit, changing the required torque according to an accelerator pedal input value to required torque set to a higher value than a value during system limit under the same accelerator pedal input value condition, changing the required torque slope limit value to a higher value than a value during system limit, and changing to an EV-HEV mode transition reference value set to a smaller value than an EV-HEV mode transition reference value during system limit.

12. The method of claim 1, wherein:

the vehicle system comprises a driving motor configured to drive the vehicle, and performing the system limit release control comprises changing an operating point and an execution amount of regenerative braking of the driving motor differently from an operating point and an execution amount of regenerative braking during system limit.

13. The method of claim 1, wherein:

the vehicle system comprises a battery connected to a driving motor configured to drive the vehicle through an inverter so that the battery is allowed to be charged and discharged, and performing the system limit release control comprises releasing charge/discharge power limit of the battery.

14. The method of claim 1, wherein:

the vehicle system comprises at least one of an electric oil pump (EOP), an electric water pump (EWP), or a vehicle air conditioning system, and performing the system limit release control comprises performing power limit for reducing used power of at least one of the EOP, the EWP, or the vehicle air conditioning system compared to used power during system limit.

* * * * *